June 30, 1931.  G. T. JACOCKS  1,812,151

METHOD OF WELDING

Filed Jan. 27, 1928

INVENTOR.
GEORGE T. JACOCKS.
BY
ATTORNEY

Patented June 30, 1931

1,812,151

UNITED STATES PATENT OFFICE

GEORGE T. JACOCKS, OF BROOKLYN, NEW YORK, ASSIGNOR, BY MESNE ASSIGNMENTS, TO ALCO PRODUCTS INCORPORATED, OF NEW YORK, N. Y., A CORPORATION OF DELAWARE

METHOD OF WELDING

Application filed January 27, 1928. Serial No. 249,922.

My invention relates to a new and improved method of forming autogenous unions and to articles produced by said method, and consists more particularly in a method of joining metals by either electric arc or oxyacetylene. It will be described as applied to what is familiarly termed lap welding, and will illustrate various forms thereof.

In the prior art many methods have been used for producing welded lap-joints but considerable trouble has been experienced therewith especially where such joints have been used in cylindrical units such as tanks, boilers, etc. One of the principal faults has been that the load or pressure strain has been placed upon the weld itself resulting in a rupture at the weld. A further difficulty is experienced in such previous methods by reason of the leakage, from even a very slight imperfection in the welding of the single or straight line seams. Also in such previous methods any material within the container can more or less readily attach the weld.

It has heretofore been proposed to lap weld two pieces by perforating one, lapping it over the other which is imperforate and welding the two together through the perforation, filling up the perforation. In service, methods of this character have proven unsatisfactory as the pressure stresses on the two sheets or pieces causes a rupture of the union.

In the present invention I unite metals in the lap fashion so that the resultant weld is free of all tension strain. This is accomplished by causing the lapping metals to assume the stress by interlocking with each other and utilizing the weld largely as an adhesive seal for the joint.

The interlocking of the metals is produced by perforating one piece and forming projections in the other piece that will register with and enter the perforations of the first piece. With the structure I propose, the projections being formed of the metal itself, cause the strain to be taken on the metal itself and not upon the subsequent weld. This arrangement also facilitates the welding operation by predetermining the amount of the lap.

In the accompanying drawings, I have illustrated my invention, in which

Figure 1:
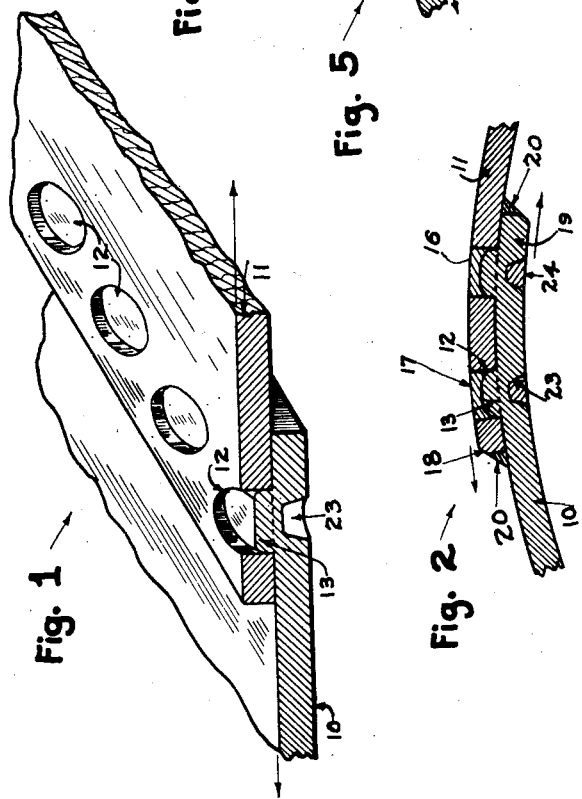
Fig. 1 is a perspective view of the invention as applied to flat surfaces, the weld being omitted.
Figure 2:
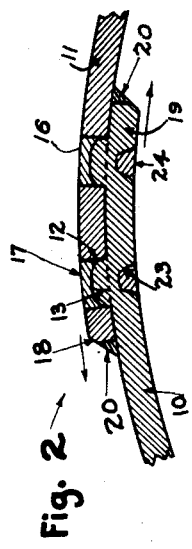
Fig. 2 is a sectional detail view of a cylindrical joint of the lapped type welded.

In Figs. 1 and 2, the numeral 10 indicates the inside or lower sheet of metal and 11 the outside sheet of the joint to be welded. Sheet 11 is provided with perforations 12 which may be arranged in any desired manner along the seam. The projections 13 are formed on the inside sheet 10 and are adapted to fit into the perforations 12.

Figure 6:
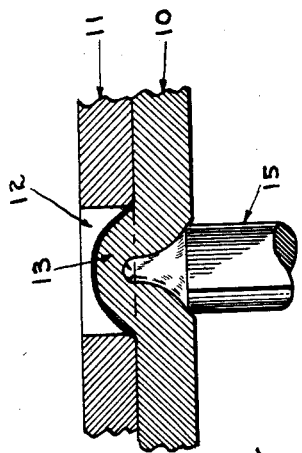
Fig. 6 is a detail showing a modified form of the method of producing the projections on the metal.
Figure 3:
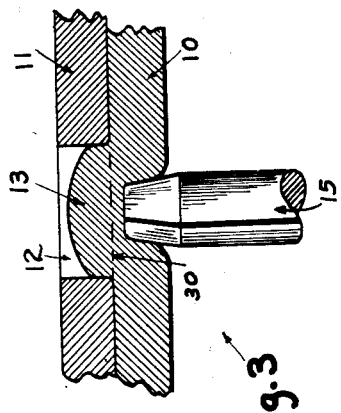
Fig. 3 is a detail view showing a method of forming projections on the metal.

The projections 13 may be formed as shown in Figs. 3 and 6 wherein the perforated sheet 11 may be regarded as a female die member, and 15 the male die member or punch. The projection 13 is formed from the metal of sheet 10 by applying pressure to the die member 15 to force the metal into the perforation 12. It will be noted that the male die member 15 is somewhat smaller than the perforation so that the metal of sheet 10 as it is being forced into the perforation 12 is not strained or ruptured on a line connecting the two adjacent edges of the two die members. Furthermore, the projection 13 does not extend entirely within the perforation 12 so that the thickness of the metal sheet remains substantially uniform where the sheet is bent, and also substantially the full cross section of the metal 10 is presented across the base of the perforation 12 thus eliminating weakness at this place. In Fig. 3 the full cross section is presented to the perforation whereas in Fig. 6 the upper end of the die 15 is shown as projecting beyond the base line of the perforation. By comparing Figs. 3 and 6 the differences in the male die members and the formation of the projections 13 will be readily perceived.

The jointure between the overlapped margins of the sheets comprises mortise and tenon connections. The mortises being the perforations 12 of the sheet 11, and the tenons being the projections 13 of the sheet 10. The metal of the sheet 10, in the process of forming the tenons is extruded to produce the tenons without perforating them or severing them from the sheet, the tenons being imperforate, unsevered extumescences of the sheet 10. In the form of construction shown in Fig. 3, the tenon is formed with an abrupt peripheral edge adapted to act as a stop or abutment locking the sheets against movement in a direction cross axial to the tenon, and the mortise is formed with a wall substantially at a right angle to the mortised margin. This form of construction gives the jointure great strength to resist stresses tending to separate the sheets in a direction cross axial to the tenons. Such a construction is highly advantageous in pressure tanks.

When completing the seam or joint, the spaces or pits left in the perforation or mortise 12 above the front end of the tenon, are filled with metal 17, which is welded to the edges of the pits and to the front ends of the tenons. The bodies of weld metal 17, serve to hold the sheets against separation in a direction axially of the tenons, and produce in effect a tenon throughout the entire depth of the mortise. A continuous fillet seam of metal is preferably welded to the end of each sheet and to the face of the adjacent sheet as indicated at 20. These continuous fillet seam welds serve as a seal for the joint. The recesses or pits at the rear ends of the tenons formed by the die member 15, are filled with metal 24, which is welded to the wall of the pit. These fillers serve to prevent deformation of the extumescences when heavy stresses are encountered.

Figure 4:
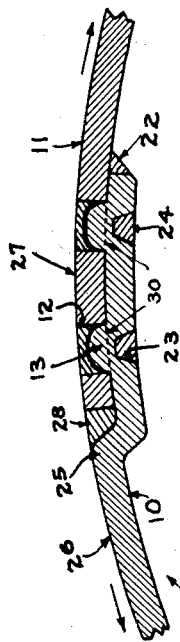
Fig. 4 is a sectional detail of a modified form of the joint shown in Fig. 2.

A modified form of joint is shown in Fig. 4 wherein the inside sheet 10 is provided with an offset 25 so arranged as to bring the outer surfaces 26 and 27 of the respective sheets on the same line. The joint is completed as described above, except that weld metal is used as indicated at 28 to secure the plates 10 and 11 at the offset 25.

Figure 5:
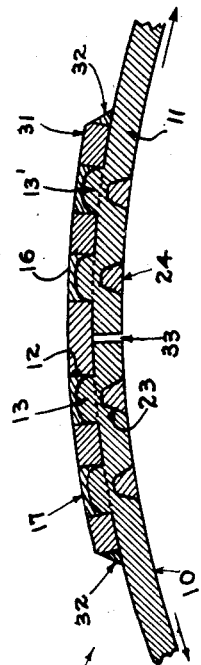
Fig. 5 is a sectional detail showing my invention as applied to a butt-lap weld joint.

A further modified form is shown in Fig. 5 in which a supplementary plate 31 over the seam is formed by the abutting plates 10 and 11. The plate 31 contains the perforations 12, and the plates 10 and 11 are provided with projections 13 and 13' which are received in the perforations 12. The ends of the plate 31 are filleted to the plates 10 and 11 as indicated at 32 while the unfilled perforations 12, and the indentations 23 are likewise filled with weld metal. The joint 33 between the plates 10 and 11 may or may not be filled with weld or caulked, as desired.

The functioning of my invention may be briefly summarized as the formation of a welded joint by causing projections formed of one of the sheets of the joint to engage in perforations of another sheet of the joint in such a manner, and the projections being so formed, that any stresses or strains on the joint are borne by the sheets themselves through the medium of the projections. That is to say, any strains tending to spread the union or joint will be taken by the metal along the dotted lines indicated at 30 in the drawings. Hence, I have so arranged the projection as to present at this point substantially the full strength of the sheet of which it is formed without rupturing or otherwise altering the character of the metal in forming the projection. A further step which is the filling step in my invention is the filling of the spaces above and below the projection so that the union is strengthened at this point rather than weakened.

It will be seen that, if so desired, the projections 13 may be formed before the sheets are lapped, so that the projections virtually act as dowels in the assembly stage and materially assist such work, predetermining the amount of the lap and holding the sheets in position. Also that the perforations could be formed in the lower sheet and the projections in the upper sheet, which is merely the reverse of the arrangement shown in the drawings.

It will be understood that various changes of structural detail may be made without departing from the scope or spirit of the invention as defined by the appended claims.

I claim:

1. In a metal article having a fluid proof jointure comprising overlapping margins of sheets of metal; a plurality of spaced mortises in the margin of one of the sheets, each mortise being a perforation through said margin; a plurality of tenons projecting from the margin of the other sheet and interfitted in the mortises to hold the sheets against relative movement in their respective parallel planes, each of said tenons being disposed inwardly of the edge of the margin of the tenoned sheet, terminating short of the depth of its mortise thereby providing a pit, and being an unsevered extumescence of the tenoned margin; a pit at the rear of each tenon; and a filler of metal in each of the pits, said filler in the pit at the front end of the tenons being welded to the peripheral walls of the mortise and to the front end of the tenon.

2. The method of producing a mortise and tenon jointure between two metal sheets having overlapping margins which comprises forming a mortise extending entirely through the margin of one sheet, having its walls substantially perpendicular to the surfaces of the sheets; forming a tenon comprising an imperforate and unsevered extumescence on the margin of the other sheet of less length than the mortise and tightly fitting the walls of the mortise, by extruding metal from said margin directly into the mortise by forcing an implement into said tenoned margin from the rear thereof concentric with said mortise so as to form a pit in said margin behind the tenon and concentric therewith, where, by the deformation of the metal the mortise and tenon are force-fitted together; welding a filler of metal in said pit to aid in maintaining the state of deformation and resultant force-interfitting of the tenon and mortise; and welding a filler of metal in the front end of the tenon in the wall of the mortise to hold the two against relative movement axially of the tenon.

3. The method of producing a mortise and tenon jointure between two metal sheets having overlapping margins, which comprises forming a mortise extending entirely through the margin of one sheet; forming a tenon comprising an imperforate and unsevered extumescence on the margin of the other sheet of less length than the mortise and tightly fitting the walls of the mortise, by extruding metal from such margin into the mortise of the other margin so as to leave a pit at the rear end of the tenon; welding a filler of metal to the front end of the tenon and to the wall of the mortise; and welding a filler of metal to the walls of the pit.

In testimony whereof I affix my signature.

GEORGE T. JACOCKS.